(12) United States Patent
Di Sante et al.

(10) Patent No.: US 6,761,374 B2
(45) Date of Patent: Jul. 13, 2004

(54) ROOF PANEL LINING OF A VEHICLE WITH PREASSEMBLED HEAD PROTECTION ELEMENTS (HEAD BAGS)

(75) Inventors: Giuseppe Di Sante, Roseto Degli Abruzzi (IT); Mario Biggio, Roseto Degli Abruzzi (IT); Patrizio D'ambrosio, Roseto Degli Abruzzi (IT); Giovanni Bessone, Villanova Mondovi' (IT)

(73) Assignee: Industrialesud S.p.A., Teramo (IT)

( * ) Notice: Subject to any disclaimer, the term of this patent is extended or adjusted under 35 U.S.C. 154(b) by 64 days.

(21) Appl. No.: 10/138,924

(22) Filed: May 3, 2002

(65) Prior Publication Data
US 2002/0190507 A1 Dec. 19, 2002

(30) Foreign Application Priority Data
May 8, 2001 (IT) .................................... MI2001A0942

(51) Int. Cl.[7] .............................................. B60R 21/16
(52) U.S. Cl. ................................ 280/728.2; 280/730.2
(58) Field of Search .......................... 280/730.2, 730.1, 280/728.2

(56) References Cited

U.S. PATENT DOCUMENTS

| | | | | |
|---|---|---|---|---|
| 6,079,732 A | * | 6/2000 | Nakajima et al. | 280/728.2 |
| 6,082,761 A | * | 7/2000 | Kato et al. | 280/730.2 |
| 6,129,377 A | * | 10/2000 | Okumura et al. | 280/730.2 |
| 6,155,594 A | * | 12/2000 | Ibe et al. | 280/728.2 |
| 6,173,990 B1 | * | 1/2001 | Nakajima et al. | 280/730.2 |
| 6,234,517 B1 | * | 5/2001 | Miyahara et al. | 280/730.2 |
| 6,302,434 B2 | * | 10/2001 | Nakajima et al. | 280/730.2 |
| 6,305,707 B1 | * | 10/2001 | Ishiyama et al. | 280/728.2 |
| 6,333,515 B1 | * | 12/2001 | Kubota et al. | 280/730.2 |
| 6,334,626 B2 | * | 1/2002 | Nakajima et al. | 280/730.2 |
| 6,485,048 B2 | * | 11/2002 | Tajima et al. | 280/728.2 |

* cited by examiner

Primary Examiner—Charles T. Jordan
Assistant Examiner—T. Nguyen
(74) Attorney, Agent, or Firm—Hedman & Costigan, P.C.

(57) ABSTRACT

A roof panel lining of a vehicle with preassembled head protection elements so-called "head-bag", comprising a complex element (22) with a head bag unit (25) with a shaped support (26a, 26b) and arranged integrally in relation to a roof panel lining (11) by reciprocal constraining elements (28, 29; 27, 30), in which the complex element (22) is arranged in a recessed zone (17) of the roof panel lining (11), covered by one or more longitudinal side covering and closing elements (18), in turn fastened to a body (14) of the vehicle by a handle (38) and provided with a weakening notch (43) which, in the inflation phase, allows release of a bag of the "head bag" unit (25).

8 Claims, 4 Drawing Sheets

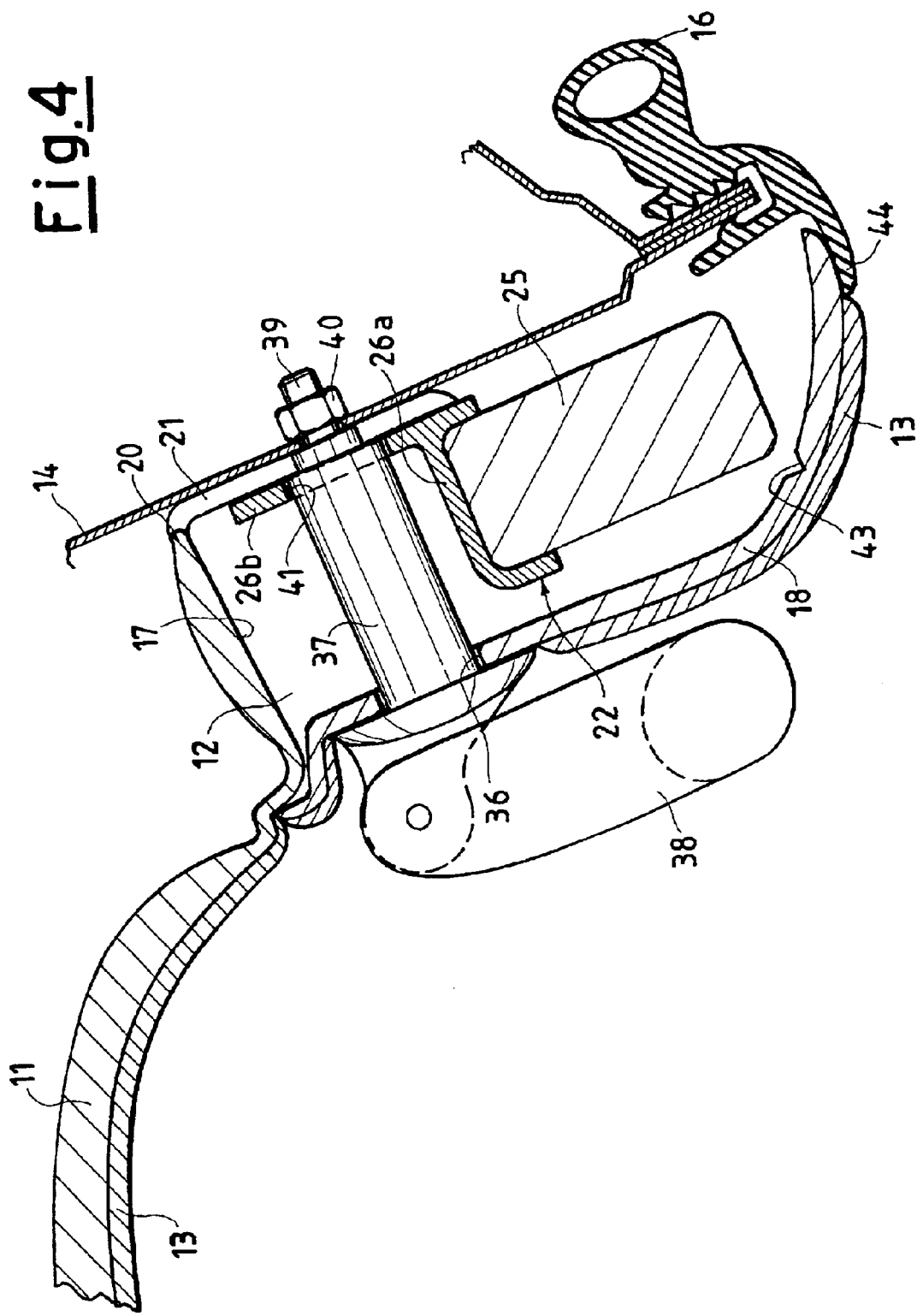

ROOF PANEL LINING OF A VEHICLE WITH PREASSEMBLED HEAD PROTECTION ELEMENTS (HEAD BAGS)

The present invention relates to a roof panel lining of a vehicle with preassembled head protection elements, so-called "head bag".

In the field of the automobile industry each part or element equipping the vehicle involves optimization both of manufacturing costs and its assembly.

In fact, all attempts are made to eliminate times that can slow down the fitting out of the vehicle to reduce costs to a minimum.

Another object is to be have the maximum certainty that each element has been correctly assembled, to permit access to each component and thus increase its functionality, avoiding possible faulty operation.

When fitting of safety systems to protect passengers, such as those known as top side "head bags", it is not always easy to position them.

The object of the present invention is therefore to provide a solution to the general technical problem above, referring in particular to "head bags".

Another object is to optimise the position of the protection element called "head bag", in particular along the top side of the vehicle.

Yet another object is to produce a roof panel lining with head protection elements preassembled on it to thus obtain a module, particularly simple and fast to use and with a moderate cost.

These objects according to the present invention are attained by producing a roof panel lining with head protection elements, the so-called "head bag", preassembled on it, as set forth in the attached claim 1.

Further important characteristics and details of the present invention are the subject of the dependent claims.

Figure 1:
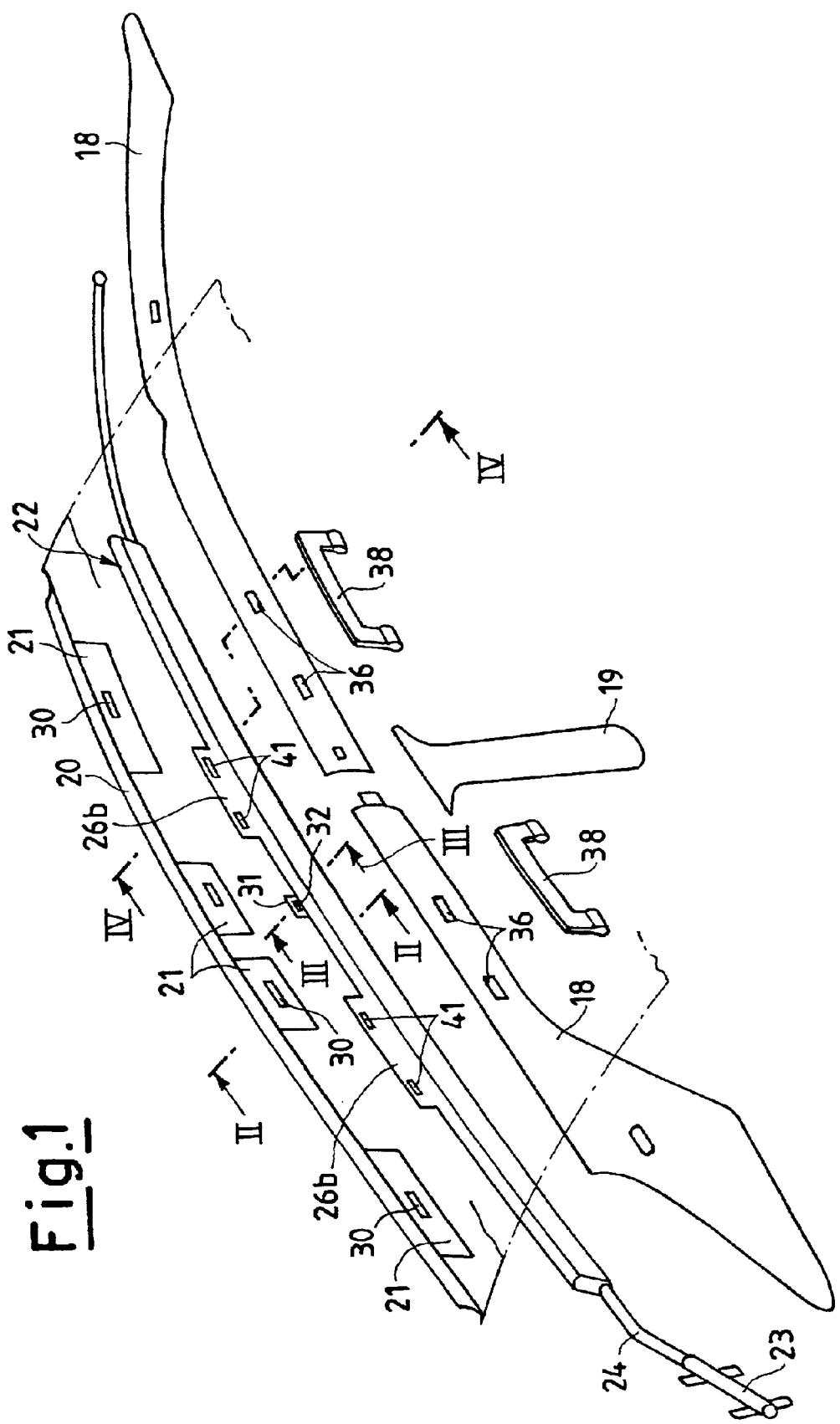
Figure 2:
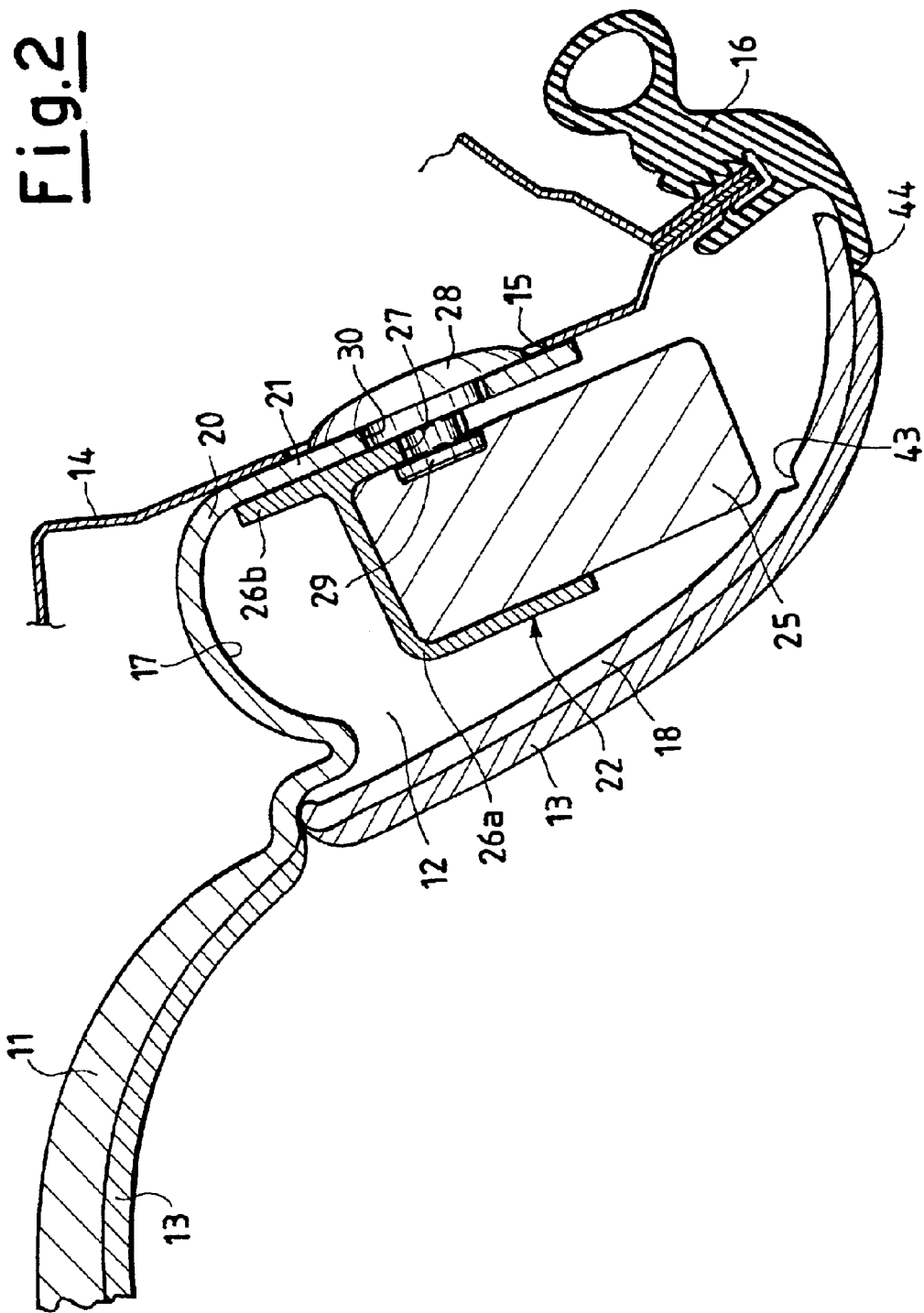
Figure 3:
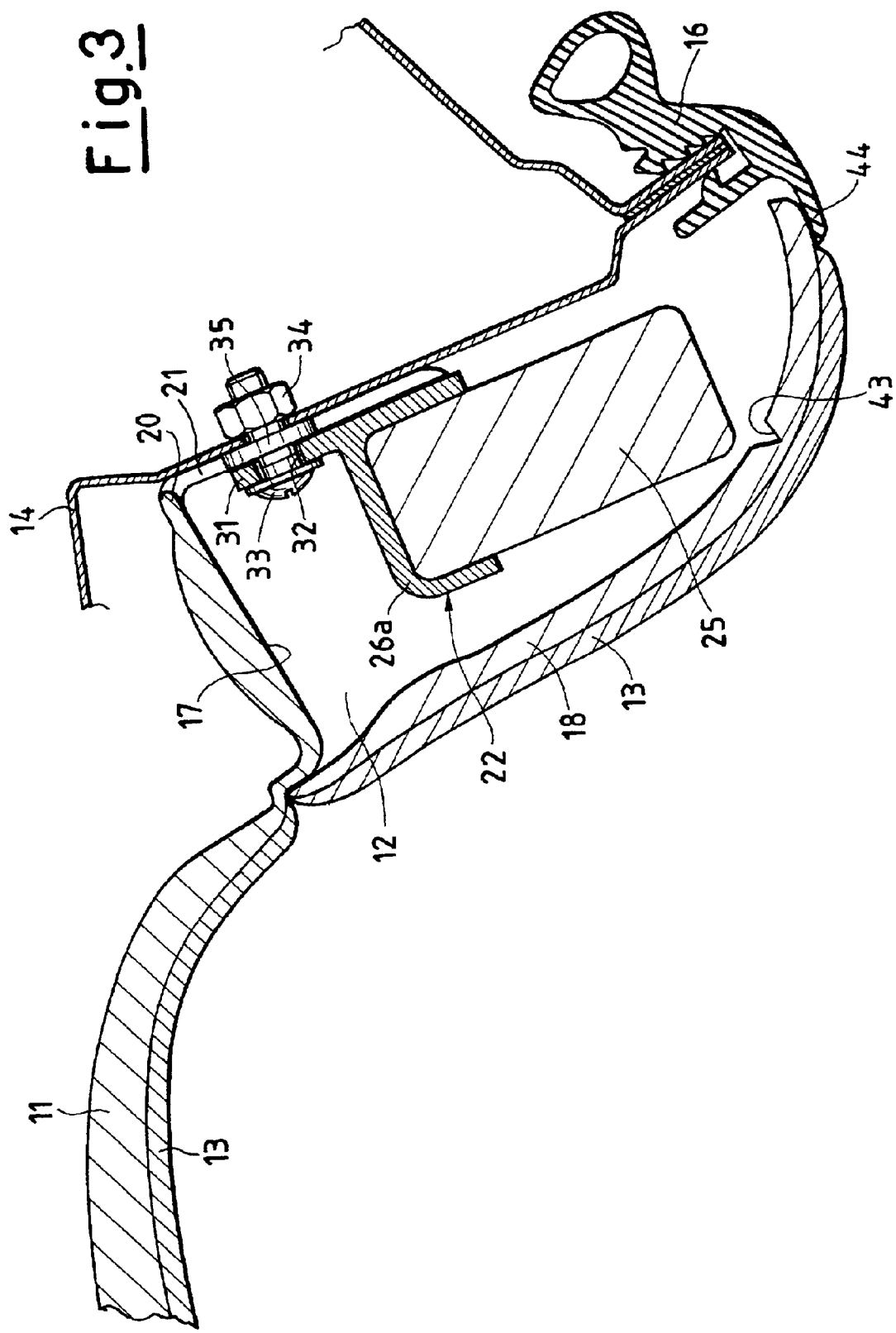

The characteristics and advantages of a roof panel lining of a vehicle with preassembled head protection elements "head bag" according to the present invention shall become clearer and more apparent from the description below, provided purely as a non-limiting example, of an embodiment with reference to the accompanying figures, in which:

FIG. 1 is a perspective view showing the assembly diagram of the side assembly with head protection elements preassembled in a vehicle according to the present invention, FIG. 2 is an enlarged sectional view along the line II—II of FIG. 1, FIG. 3 is an enlarged sectional view along the line III—III in FIG. 1, FIG. 4 is an enlarged sectional view along the line IV—IV in FIG. 1.

With general reference to the various figures, a roof panel lining 11 of a vehicle with preassembled head protection elements "head bag" is shown in an entirely schematic manner. The head bag system, thus preassembled on the roof panel lining 11, can be fastened directly to the body and is immediately accessible and inspectable simply by removing the post covers, indicated with 18 and 19.

As can be better seen in FIGS. 2–4, the assembly of the present invention identifies a special housing 12 obtained in the lining 11 of the roof panel. The roof panel lining 11 is for example obtained in polyurethane or another suitable material and is covered with a layer of fabric 13 or similar.

The reference number 14 generically indicates parts of the body fitted with a seal 16 of the side area of the vehicle and above the door (not shown).

More precisely, the roof panel lining 11 identifies a recessed zone 17 which forms the housing 12, closed by various covering and closing elements shown schematically in 18 and 19 and generally termed "post covers".

The perspective view in FIG. 1 shows the various elements of the invention spaced from one another in an exploded view, while the various assembled sections (FIGS. 2–4) allow a better understanding of the reciprocal positioning of the parts.

From FIG. 1 it can be seen that the complex "head bag" element, indicated with 22, is positioned on a lower perimetric portion 20 of the recessed zone 17 of the lining 11 that is specifically provided with plate extensions 21 for fastening.

It can be noted in particular that this complex element 22 comprises an explosive charge 23 connected by means of a connecting pipe 24 to a "head bag" shown schematically in 25.

It can also be noted that, according to the invention, the "head bag" unit 25 is arranged integrally in relation to a longitudinal side support 26a, 26b. This side support has a U-shaped portion, facing downward 26a to house the "head bag" unit 25 and a series of portions facing upward 26b for fastening to the element of the body 14.

The downward facing U-shaped portion 26a has longitudinal elongated openings 27 suitable to receive fastening elements 28, which can be positioned by rotation with extensions provided with rectangular plate ends 29, after having passed through longitudinal elongated openings 30 of the plate extensions 21 of the lining 11. This first reciprocal arrangement shows how first constraint is obtained between the lining 11 of the roof panel and the complex element 22 with the "head bag" unit 25. The enlarged head portion of the fastening elements 28 is housed in a wide opening 15 made in the body 14.

Moreover, it is noted how subsequent assembly of the lining 11-complex element 22 assembly in relation to the body 14 is much simpler.

In fact, FIG. 3 shows further plate extensions 31 of the complex element 22, facing upward, and provided with holes 32. Bolts 33, nuts 34 and respective spacers 35 determine steady positioning in relation to the body 14 in which a relative hole, not shown, is made. This integral fastening of the complex element 22 and the lining 11 to the body is performed by a certain number of constraints, such as those described above. A first constraint is thus obtained between the body and the assembly of the invention.

FIG. 4 shows how a second constraint is obtained and how the covering of the bag forming part of the complex element 22 is produced.

In fact, FIGS. 1 and 4 show the presence of further elements previously indicated as covering and closing elements 18 and 19. More specifically, longitudinal 18 and vertical 19 side covering and closing elements are provided.

It must be noted how these side covering elements 18 have openings 36 through which couplings 37 constrained to handles 38 pass. Free ends of said couplings 37 have a threaded shank 39 suitable to receive a lock nut 40. The threaded shank 39 is fitted and passes through holes 41 obtained in the upward facing portions 26b of the complex element 22.

In this way, fastening of the handles 38 to the body 14 and a further fastening of the lining 11-complex element 22 assembly is obtained.

Naturally, the completing vertical covering and closing elements 19 are also assembled in this phase.

It must be noted that the longitudinal side covering and closing elements 18 have an external layer of material in fabric 13 in the same manner as the lining 11. Moreover, it is important to note that weakening notches 43 are provided in an area facing downward, which during inflation allow release of the bag.

In fact, it is noted that, owing to deformation, as the top part of the elements 18 is locked in relation to the body 14, these elements 18 are released downward. In fact, a curved end 44 of the seal 16 engages externally with the lower end of the covering and closing element 18, which the latter is free to translate and allow release of the bag.

It is thus shown how the roof panel lining with the preassembled head bag system according to the present invention is particularly functional, simple and quick to install.

This also makes it possible to eliminate reciprocal constraining of parts and elements already identified during preassembly of the lining of the roof panel in relation to the complex element 22 of the "head bag" unit.

Assembly of said roof panel lining complete with head bag is already extremely clear from what is set forth here and is extremely simple to perform.

It is thus also seen that the housing 12 obtained in the lining 11 of the roof panel, allows correct reaction and guiding of the bag during inflation.

Consequently, the roof panel lining with preassembled head bag according to the present invention achieves the stated objects.

The roof panel lining with head protection elements preassembled in a vehicle of the present invention thus designed is susceptible to numerous modification and variants, without departure from the scope of the invention.

Moreover, in practice the materials used, their dimensions and components may be any according to technical requirements.

What is claimed is:

1. Roof panel lining of a vehicle with preassembled head protection elements which comprises a U-shaped complex element (22), with at least one "head bag" unit (25) in a shaped support (26a, 26b), and arranged integrally in a removable manner in relation to a roof panel lining (11) by reciprocal manner in relation to a roof panel lining (11) by reciprocal constraining elements (28, 29, 27, 30), said complex element (22) being arranged in a recessed zone (17) of the lining (11), covered by at least one longitudinal aide covering and closing element (18), which is in turn fastened to a body (14) of said vehicle at least by a handle (38) and provided with a V-shaped weakening notch (43) which, in the inflation phase, allows release of at least one bag of the "head bag" unit (25).

2. Roof lining panel as claimed in claim 1, wherein said shaped support (26a, 26b) of said complex element (22) comprises a U-shaped portion, facing downward (26a) to house the "head bag" unit (25) and a series of portions facing upward (26b) for fastening to said body (14).

3. Roof panel lining as claimed in claim 2, wherein said downward facing U-shaped portion (26a) has longitudinal elongated openings (27) suitable to receive fastening elements (28), after these have passed through openings (30) of downward facing plate extensions (21) of said lining (11).

4. Roof panel linings as claimed in claim 1, wherein it is provided with plate extensions (26b) of said complex element (22), facing upward, and provided with holes (41) for fastening said handles (38).

5. Roof panel linings as claimed in claim 1, wherein said complex element (22) comprises in a single piece bath an explosive charge (23) connected (in 24) to a "head bag" unit (25) and a longitudinal side support (26a, 26b) for said "head bag" unit (25).

6. Roof panel element as claimed in claim 1, wherein a bottom end of said longitudinal side covering and closing element (18) is engaged internally, free to translate, at one end of a seal (16) of the side area of the vehicle and above the door.

7. Roof panel as claimed in claim 1, wherein it is provided, for each side of the vehicle, with two longitudinal side covering and closing elements (18) and one vertical covering and closing element (19) of the post.

8. Roof panel lining of a vehicle with preassembled head protection elements which comprises a U-shaped complex element (22), with at least one "head bag" unit (25) in a shaped support (26a, 26b), and arranged integrally in a removable manner in relation to a roof panel lining (11) by reciprocal manner in relation to a roof panel lining (11) by reciprocal constraining elements (28, 29; 27, 30), said complex element (22) being arranged in a recessed zone (17) of the lining (11), covered by at least one longitudinal side covering and closing element (18), which is in turn fastened to a body (14) of said vehicle at least by a handle (38) and provided with a V-shared weakening notch (43) which, in the inflation phase, allows release of at least one bag of the "head bag" unit (25).

* * * * *